United States Patent [19]

Steigelmann et al.

[11] 3,758,603

[45] Sept. 11, 1973

[54] PROCESS FOR SEPARATION OF UNSATURATED HYDROCARBONS

[75] Inventors: Edward F. Steigelmann; Robert D. Hughes, Park Forest, both of Ill.

[73] Assignee: Standard Oil Company, Chicago, Ill.

[22] Filed: May 12, 1972

[21] Appl. No.: 252,607

[52] U.S. Cl.............. 260/677 A, 55/16, 260/679 A, 260/681.5
[51] Int. Cl........................ C07c 11/12, C07c 9/00
[58] Field of Search.................. 260/677 A, 679 A, 260/676 A, 681.5 C; 55/16

[56] References Cited
UNITED STATES PATENTS

| | | | |
|---|---|---|---|
| 3,244,763 | 4/1966 | Cahn | 260/677 R |
| 3,396,510 | 8/1968 | Ward et al. | 55/16 |
| 3,335,545 | 8/1967 | Robb et al. | 55/16 |
| 3,172,741 | 3/1965 | Jolley | 55/16 |
| 3,256,675 | 6/1966 | Robb | 55/16 |
| 3,410,794 | 11/1968 | Norman | 55/16 |
| 3,004,085 | 10/1961 | Ewanchyna et al. | 260/681.5 C |

*Primary Examiner*—Delbert E. Gantz
*Assistant Examiner*—Juanita M. Nelson
*Attorney*—John W. Behringer et al.

[57] ABSTRACT

There is described the separation of aliphatically unsaturated hydrocarbons from mixtures by the combined use of liquid barrier permeation and metal complexing techniques. The liquid barrier is in contact with a film membrane, and the barrier contains complex-forming metal ions in aqueous solution. The metal ions may be, for example, noble metal, mercuric, cuprous or other metal ions, and mixtures of these metal ions, with or without other cations, may be used. The separation of ethylene from ethane and methane is of particular interest.

20 Claims, No Drawings

PROCESS FOR SEPARATION OF UNSATURATED HYDROCARBONS

This invention relates to the separation of aliphatically-unsaturated hydrocarbons from mixtures containing the hydrocarbons to be separated along with other materials. More particularly, this invention is concerned with the separation of aliphatically-unsaturated hydrocarbons by the combined use of liquid barrier permeation and metal complexing techniques. The invention is especially useful for separating ethylene from gaseous mixtures containing it and other hydrocarbons, for example, one or both of ethane and methane.

There is considerable commercial interest in separating aliphatically-unsaturated hydrocarbons from mixtures containing them. These aliphatically-unsaturated hydrocarbons are reactive materials that serve in various roles, generally as intermediates in chemical syntheses. A number of the unsaturated hydrocarbons are employed as monomers in the formation of polymers and in this regard, olefins such as ethylene, propylene, butadiene and isoprene are well known. These olefins, as well as other unsaturated materials, for instance, ethylene and acetylene, are also used to form relatively low molecular weight products.

The aliphatically-unsaturated hydrocarbons are most often made available on a commercial basis in admixture with other chemical compounds, frequently other hydrocarbons. These unsaturated hydrocarbon-containing streams are usually by-products of chemical syntheses or separation processes. When the hydrocarbon streams are liquid under normal conditions or can readily be made so, ordinary distillation techniques can be used to separate the hydrocarbon components providing they have sufficiently different boiling points for the process to be economically feasible. Especially when the hydrocarbon mixtures contain materials having close boiling points, which is often the case with hydrocarbons of the same number of carbon atoms or having a difference of only one carbon atom, distillation may not be an attractive separation procedure. In such cases, more expensive processes are often used and involve operations such as solvent extraction or extractive distillation which entail considerable expense, if indeed they are technically feasible in a given situation.

When the mixture containing the aliphatically-unsaturated hydrocarbon is essentially in a gaseous state at normal or ambient conditions of temperature and pressure, separation of the desired component from the mixture may be even more troublesome. In these situations, cryogenic processes may be used, but they are expensive. The components of these normally gaseous mixtures may not even have particularly close boiling points, but nevertheless the mixture must be cooled in order to separate one or more of its components. In spite of the considerable cost of cryogenic operations, the procedure has been employed commercially for the separation of ethylene from other gaseous materials such as ethane and methane.

The present invention is directed to a method for separating aliphatically-unsaturated hydrocarbons from mixtures containing them and involves the combined use of liquid barrier permeation and metal complexing techniques which can provide high selectivity factors. This procedure can be employed alone to separate one or more unsaturated hydrocarbons, or it may be used in conjunction with other separating steps, for instance, a cryogenic operation, and still be economically advantageous compared with an all-cryogenic system. Although the aliphatically-unsaturated hydrocarbon product provided by the method of this invention may be a quite pure material, for instance, of greater than 99 percent purity, the separation procedure may be used merely to provide a significant increase in the concentration of a given aliphatically-unsaturated hydrocarbon in a mixture with other components of the feedstock.

The process of this invention can be employed to separate various aliphatically-unsaturated hydrocarbons from other ingredients of the feed mixture providing at least one of the aliphatically-unsaturated hydrocarbons exhibits a transfer rate across the liquid barrier that is greater than at least one other dissimilar component of the feedstock. Quite advantageously, the system can be used to separate aliphatically-unsaturated hydrocarbons from other hydrocarbons which may be aliphatically saturated or unsaturated, or from non-hydrocarbon materials, including fixed gases such as hydrogen. The feed mixture may thus contain one or more paraffins, including cycloparaffins, mono or polyolefins, which may be cyclic or acyclic, and acetylenes or alkynes, and the mixture may include aromatic structures having such aliphatic configurations in a portion of their structure.

In the method of the present invention, the mixture containing the aliphatically-unsaturated hydrocarbon to be separated may be essentially in the gaseous or vapor phase when in contact with a liquid barrier having dissolved therein one or more metal ions which form a complex with the unsaturated hydrocarbon. The liquid barrier is generally in contaact with a semi-permeable member which is essentially impermeable to the liquid, and may be permeable to the aliphatically-unsaturated hydrocarbon-containing mixture at the conditions used during the separation. The semi-permeable member may, for instance, be a film or membrane of the type that has been employed heretofore for the separation or purification of various chemical materials. Such films are disclosed in U.S. Pat. Nos. 3,335,545 and 3,447,286, herein incorporated by reference. The liquid barrier can be formed by using the semi-permeable membrane in a number of ways, and the membrane can be said to immobilize the liquid barrier within or adjacent to the feed side of the membrane. Thus the liquid barrier may be held between two solid, permeable films which prevent passage of the liquid therethrough. In this structure the liquid barrier may be absorbed in a porous matrix, for example, a cellulose acetate filter. In a second type of structure the liquid barrier may be formed by supporting the liquid on a surface which is impermeable to the liquid. The feedstock can be passed into the liquid layer and the barrier is formed at the liquid-supporting surface interface. The liquid barrier may be partly or completely absorbed in the supporting structure providing the exit side of the structure is impermeable to the liquid under the conditions of operation, but permeable in the presence of the liquid barrier to the component of the feedstock to be separated. Thus the liquid barrier may be a continuous liquid film or layer or it may be discontinuous as may be the case when the liquid is held within a solid support. However, there is little, if any, passage for the feedstock across the separation zone except by becoming part of or reacting with the liquid barrier and thus this liquid barrier controls the selectivity of the liquid barrier-semi-permeable membrane combination.

The liquid barrier contains sufficient water and soluble metal ions to form a suitable complex with at least one aliphatically-unsaturated hydrocarbon component of the feed subjected to the separation procedure. The metal ions readily form the complex upon contact with the feed, and, in addition, the complex is converted back to the metal ion and an aliphatically-unsaturated hydrocarbon component of the complex, under the conditions which exist on the discharge or release side of the liquid barrier as employed in this invention. The released aliphatically-unsaturated hydrocarbons exit the discharge side of the liquid barrier and can be removed from the vicinity of the barrier and its supporting structure as by a sweep gas or through the effect of vacuum on this side of the barrier. Thus the unsaturated hydrocarbon-metal complex forms and is decomposed in the complex metal ion-containing liquid barrier, and as a result the material passing through the barrier is more concentrated with respect to at least one aliphatically-unsaturated hydrocarbon component present in the feed stream.

Often the activity of aliphatically-unsaturated hydrocarbons with the complexing metal ions in the order of decreasing activity goes from acetylenes or dienes to monoolefins, the aliphatically-saturated hydrocarbons and other materials present being essentially non-reactive. Also different reactivities may be exhibited among the various members of a given one of these types of aliphatically-unsaturated hydrocarbons. The process of this invention can thus be used to separate paraffins from monoolefins, diolefins or acetylenes; diolefins from monoolefins; or acetylenes from paraffins, monoolefins or diolefins; as well as to separate a given aliphatically-unsaturated hydrocarbon from another of such materials in the same class where the members have differing transport rates across the liquid barrier. The feed need only contain a small amount of aliphatically-unsaturated hydrocarbon, as long as the amount is sufficient so that the unsaturated material to be separated selectively reacts with the metal complex ions to a significant extent, and thus at least one other component of the feed is less reactive or non-reactive with the complex-forming metal ions. The aliphatically-unsaturated materials of most interest with regard to separation by the method of the present invention, have two to about eight carbon atoms, preferably two to four carbon atoms. The separation of aliphatically-unsaturated materials from admixtures containing other gaseous materials, such as the separation of ethylene from ethane and methane, is of particular importance. Frequently such feed mixtures for the process contain about 1 to 50 weight percent ethylene, about 0 to 50 weight percent ethane and about 0 to 50 weight percent methane. Propylene is an olefin in high demand, and its separation may be accomplished in accordance with the present invention. Another process that may be of special significance is the separation from ethylene of minor amounts of acetylene.

The partial pressure of the aliphatically-unsaturated component of the feed at its charged side of the liquid barrier used in the present invention is greater than on the discharge or exit side. The partial pressure drop of the unsaturated hydrocarbon may often be at least about 0.5 pound per square inch, and is preferably at least about 20 psi. Conveniently, the total pressure of the feed is up to about 1000 pounds per square inch, although the total pressure or pressure drop should not be so great that the liquid barrier is ruptured or otherwise deleteriously affected to a significant extent. The discharge partial pressure of the unsaturated hydrocarbon can preferably be controlled by subjecting the exit side of the liquid barrier to the action of a sweep gas that is essentially inert to forming a complex with the metal ions of the aqueous solution in liquid barrier. The sweep gas picks up the discharged aliphatically-unsaturated components, and the sweep gas may be selected so that it can be readily separated from the aliphatically-unsaturated hydrocarbon material if that be necessary for the subsequent use of the unsaturated hydrocarbon. Unless a reaction with the separated hydrocarbon is desired, the sweep gas should be relatively inert therewith and may be, for instance, butane, carbon dioxide or the like.

The temperature across the liquid barrier employed in the method of this invention can be essentially constant or it may vary, and decomposition of the metal-unsaturated hydrocarbon complex can be effected primarily by the drop in partial pressure of the aliphatically-unsaturated hydrocarbon on the exit side of the liquid barrier compared with that on the feed side. Conveniently, the temperature of the liquid barrier may be essentially ambient, especially in the case of feedstocks that are gaseous at this temperature and the pressure employed on the feed side of the liquid barrier. The temperature of the liquid barrier may, however, be reduced or elevated from ambient temperature. Often the temperature may be up to about 100° C., and elevated temperatures may even be desired to put the feedstock in the gaseous or vapor phase. Neither the temperature nor the pressure used should, however, be such as to destroy the difference in transport rate across the liquid barrier of the aliphatically-unsaturated hydrocarbons whose separation is sought compared with that of the other components of the feed. These conditions should also not be such that physical disruption of the liquid barrier or any other significant malfunction results.

In the present invention we have found that those metals which can serve in the form of metal-containing cations to separate aliphatically-unsaturated hydrocarbons in the feed mixture through the formation of metal complexes of desired properties include, for instance, the transition metals of the Periodic Chart of Elements having atomic numbers above 20. Included in these metals are those of the first transition series having atomic numbers from 21 to 29, such as chromium, copper, especially the cuprous ion, manganese and the iron group metals, e.g. nickel and iron. Others of the useful complex-forming metals are in the second and third transition series. i.e. having atomic numbers from 39 to 47 or 57 to 79, as well as mercury, particularly as the mercuric ion. Thus we may employ noble metals such as silver, gold and the platinum group, among which are platinum, palladium, rhodium, ruthenium and osmium. The useful base metals of the second and third transition series include, for example, molybdenum, tungsten, rhenium and the like. Various combinations of these complexing-forming metals may also be employed in this invention, either in the presence or absence of other non-metal or non-complexing metal cations.

The metal is provided in the aqueous liquid barrier in contact with the semi-permeable member in a form which is soluble in this liquid. Thus the various water-soluble salts of these metals can be used such as the nitrates and halides, for instance, the bromides and chlorides, fluoborates, fluosilicates, acetates, carbonyl halides or other salts of these metals which can serve to form the desired water-soluble complexes. The metal salts should not react with any components of the aliphatically-unsaturated hydrocarbon-containing feed to form an insoluble material which could block the film membrane or otherwise prevent the separation of the desired component of the feedstock. Also in a given system, the metal is selected so that the complex will readily form and yet be sufficiently unstable so that the complex will decompose and leave the liquid barrier, thereby providing a greater concentration of the aliphatically-unsaturated hydrocarbon to be separated from the exit side of the barrier than in the feed. The concentration of the metal ions in the liquid barrier may be rather low and still be sufficient to provide an adequate complexing rate so that excessive amounts of the semi-permeable membrane surface will not be needed to perform the desired separation. Conveniently, the concentration of the complex-forming metal ions in the aqueous solution forming the liquid barrier is at least about 0.1 molar and is preferably about 0.5 to 12 molar. Advantageously, the solution is less than saturated with respect to the complex-forming metal ions to insure that essentially all of the metal stays in solution, thereby avoiding any tendency to plug the film membrane and destroy its permeability characteristics.

When the complexing ions in the liquid barrier employed in this invention are cuprous ions, ammonium ions can be used to provide copper ammonium complex ions which are active to form a complex with the aliphatically-unsaturated hydrocarbons to be separated. We preferably supply about equimolar amounts of cuprous and ammonium ions in the liquid barrier solution, although either type of ions may be in excess. The ammonium ions can be provided in various convenient ways, preferably as an acid salt such as ammonium chloride. In order to enhance the selectivity of the copper ammonium ion complex in the separation of this invention, we may also make the liquid barrier solution more acidic, by, for instance, providing a water-soluble acid such as a mineral acid, especially hydrochloric acid in the solution. Preferably, the pH of the liquid barrier in this form of the invention is below about 5 with the acid in the solution. Since silver may form undesirable acetylides with acetylenes, the copper ammonium complex may be a more attractive complexing agent when it is desired to separate acetylenes from its various mixtures.

Instead of supplying only a noble metal for complexing the aliphatically-unsaturated hydrocarbon in the process of this invention, we may also employ mixtures of noble metal and other cations. Our work has shown that as the noble metal concentration increases the selectivity of the desired separation may be enhanced, and we have also established that a portion of the noble metal may be replaced by non-noble metal or ammonium ions and selectivities generally comparable to those obtained with the same concentration of noble metal ions may be obtained. This result has been reached even though the non-noble metal or ammonium ion when used by itself in an effort to accomplish the desired separation, may be ineffective or only marginally suitable. Accordingly, the total of such ions in the liquid barrier may be composed of a minor or major amount of either the noble metal ions or the non-noble metal, ammonium or other cations. Solutions having a major amount of the non-noble metal, ammonium or other cations will generally be less expensive, and, accordingly, the noble metal may be as little as about 10 molar percent or less of the total cations in the solution. To reduce expenses at least about 10 molar percent, preferably at least about 50 molar percent, of the total cations may be other than the noble metal cations. The non-noble metals are preferably of Groups II to VIII of the Periodic Chart of Elements, and especially those in the fourth and fifth periods, aluminum and magnesium. Zinc and cupric ions are preferred ones among these non-noble or base metal ions. The various cations may be provided in the liquid barrier in the form of any suitable compound, such as the acid salt forms mentioned above with respect to the noble metals.

The amount of water in the liquid barrier employed in this invention may be a minor portion of the liquid phase, but preferably is a major portion or even essentially all of the liquid, on a metal salt-free basis. Thus small or minor amounts of water, say as little as about 5 weight percent, on a salt-free basis in the liquid phase may serve to provide significant transport for the aliphatically-unsaturated hydrocarbons across the liquid barrier. Any other liquid present in the barrier is preferably water-miscible and should be chosen as not to have a substantial deleterious effect on the separation to be accomplished.

As stated, in the system of the present invention the film membrane is in contact with the aqueous barrier having dissolved therein the complex-forming metal ions. In one form of the invention this contact may be provided by a liquid aqueous phase being more or less absorbed within the film with no separate aqueous phase existing as a substantial layer on the inlet side of the film. The film membrane can be wetted initially, and if it has a tendency to dry during use, additional water can be placed in the film, for instance, by inclusion of moisture in the hydrocarbon feed charged to the system. The wetness of the film can also be maintained by having a separate aqueous phase such as the solution of the complexing metal ions, adjacent to the inlet side of the film and preferably in contact with essentially all of this side of the film during its use to separate the aliphatically-unsaturated hydrocarbons. In any event, care should be taken to insure that the film membrane during use is not so dry that it will exhibit non-selective permeability to the components of the feed and will thereby not serve to increase the concentration of an aliphatically-unsaturated hydrocarbon charged to the system.

The film membrane employed in the process of this invention to support the liquid barrier is of the essentially solid, water-insoluble, semi-permeable type. In the absence of a liquid occupying the pores of the film, it is not adequately selective with respect to the passage of or permeation by the aliphatically-unsaturated hydrocarbon to perform the desired separation. Often the film is permeable to essentially all of the components in the feedstock used in this invention when they are in the gaseous phase. However, by having the film in contact with sufficient aqueous liquid to form a barrier the physical passage of gas through the film is reduced or prevented, and the components of the feed stream must therefore traverse the film primarily by becoming part of and then being separated from the aqueous liquid phase. Thus in the absence of the complexing metal ion in the aqueous medium, there could be a slight separation of hydrocarbons effected by the use of water as the liquid medium since the individual hydrocarbons may exhibit differing solubilities in water. In the method of the present invention, however, the selectivity of the separation of aliphatically-unsaturated hydrocarbons is greatly increased due to the presence of the complexing metal ions in the aqueous barrier medium contacting the film.

The film membranes which can be employed in this invention serve to prevent the physical passage of significant amounts of liquid materials through the film under the conditions at which the operation is conducted. Since an aqueous medium is employed in this system the film may exhibit hygroscopic characteristics and be essentially unreactive with the complexing ions in the liquid barrier. The films can be readily made and some are commercially available. The film membrane may be self-supporting and have sufficient strength not to require any additional supporting material on either of its sides during use. With some films, however, it may be necessary or advantageous to provide adequate support such as additional film or sheet-like materials on one or both sides of the film membrane. These supporting structures are frequently very thin materials and may be permeable to both liquids and gases and not serve a separating function with respect to any component of the feed stream.

The film membrane may be in any desirable physical shape. Flat film sheet is one useable form, although greater surface areas and more efficient separation may be provided by using tubular fibers of the types disclosed in, for instance, U.S. Pat. No. 3,228,877, herein incorporated by reference. This patent describes a variety of hydrophobic or hydrophilic hollow fibers which may be employed in the present invention, for example, those of cellulose acetate, nylon, polyvinyl chloride, polyvinyl alcohols, olefin polymers such as polyethylene, polypropylene and ethylene-propylene copolymers, and the like. Other suitable membranes are described in "Gas Permeability of Plastics," Major et al., Modern Plastics, page 135 et. seq., July, 1962; and U.S. Pat. Nos. 3,133,132; 3,133,137; 3,256,675; 3,274,750; 3,325,330; 3,335,545; 3,396,510 and 3,447,286, all incorporated herein by reference. The film membranes may often have a thickness up to about 10 mils or more, and we prefer to employ membranes having a thickness up to about 1 mil. The films must have sufficient thickness to avoid rupture at the pressures employed and often the films may have a thickness of at least about 0.001 mil.

The method of this invention will be further described with reference to the following specific examples.

EXAMPLE 1

A sandwich-type, semi-permeable membrane was constructed by placing a cellulose acetate filter between two solid films of a silicone polycarbonate polymer (XD-1 or MEM-213, trademarks, General Electric). The solid, cellulose acetate filter was obtained from the Millipore Corporation, and was 25 mm. in diameter and 0.005 /inches in thickness, and had pores of 1.2 microns in diameter. The silicone polycarbonate polymer films were 0.6 mil thick and were almost impermeable to water and silver ions, but were highly permeable to gases. The cellulose acetate filter was saturated with a 1 molar aqueous solution of silver nitrate. The saturated filter was then positioned between the silicone polycarbonate polymer films and placed in a test cell in order to determine its effectiveness in separating ethylene from admixture with ethane and methane.

The test cell was divided into upper and lower compartments by locating the membrane sandwich horizontally across the cell. The cell internal cross-sectional area was 2.8 cm.$^2$ so the cross-section was fully covered by the cellulose acetate filter. The main body of the cell had a height of 41 mm. and a gas outlet at each end. A feed inlet tube entered the upper end of the cell and opened about 5 mm. above the sandwich membrane and a sweep gas inlet tube entered the lower end of the cell and opened about 1 mm. below the sandwich membrane. The feed was charged into the upper portion of the cell (50 ml./min.) and into contact with the membrane, and the exhaust or raffinate components of the gas left the cell by the upper outlet. The feed rate was considered to be sufficient to maintain a constant gas composition on the inlet side of the membrane. A sweep gas (10 ml./min. of helium) contacted the lower surface of the membrane, picked-up the materials leaving the membrane and then exited the cell by the lower outlet as a product stream. The product was analyzed by gas chromatography with the helium serving as the carrier gas. Permeation rates were calculated from the amount of hydrocarbon in the carrier gas, the carrier gas flow rate, and the response of the gas chromatographic detector to one milliliter of the product gas mixture. The test continued over a two-hour period with the cell and gases at ambient temperature.

The results of this test are given in Table I. The data show a high degree of selectivity of the system for separating ethylene, and an increase in permeation rate and decrease in selectivity with an increase in pressure. During the test period the membrane did not show a decrease in selectivity for a given inlet gas pressure.

TABLE I

| Inlet Gas Pressure (psig.) | Permeation Rate (ml./cm.$^2$ min) | Composition of Permeate (Weight %, He-free) | | | S.F.* |
|---|---|---|---|---|---|
| | | % CH$_4$ | % C$_2$H$_4$ | % C$_2$H$_6$ | |
| (Feed Composition | — | 22.3 | 41.0 | 36.7) | — |
| 10 | 0.027 | 1.4 | 96.4 | 2.2 | 38.7 |
| 20 | 0.041 | 2.3 | 93.0 | 4.7 | 19.0 |
| 40 | 0.080 | 4.2 | 83.8 | 12.0 | 7.5 |

*S.F. = selectivity factor = ratio of permeability of ethylene compared with that of methane and ethane.

EXAMPLES 2 – 8

The procedure of Example 1 was repeated several times while varying the concentration of the complexing metal solution used to saturate the filter and also employing cupric nitrate to enhance the selectivity of lower concentrations of silver nitrate which supplied the complexing metal. The hydrocarbon feed rate was 30 ml./min. and the inlet gas pressure was 10 psig, but the other conditions were as stated in Example 1. The results of these tests are reported below in Table II.

TABLE II

| Solution | Permeate Composition, Weight %, He-free | | | Permeation Rate ml./cm.²min. | S.F. |
|---|---|---|---|---|---|
| | $CH_4$ | $C_2H_4$ | $C_2H_6$ | | |
| (Feed Composition | 22.1 | 41.0 | 36.9) | — | — |
| 1M $AgNO_3$ | 1.3 | 96.9 | 1.8 | 0.079 | 46 |
| 2M $AgNO_3$ | 0.91 | 97.8 | 1.24 | 0.082 | 65 |
| 6M $AgNO_3$ | 0.25 | 99.57 | 0.18 | 0.085 | 310 |
| 1M $Cu(NO_3)_2$ | 9.8 | 69.7 | 20.5 | 0.0078 | 3.4 |
| 1M $AgNO_3$+ 0.5M $Cu(NO_3)_2$ | 1.1 | 97.6 | 1.3 | 0.079 | 60 |
| 1M $AgNO_3$+ 1M $Cu(NO_3)_2$ | 0.91 | 97.8 | 1.3 | 0.070 | 64 |
| 1M $AgNO_3$ 3M $Cu^3(NO_3)_2$ | 0.47 | 98.9 | 0.61 | 0.064 | 134 |

These data show that as you increase the concentration of silver in the solution the selectivity factor increases substantially. Similar results can be obtained less expensively, however, by using a non-noble metal ion to increase the total metal ion concentration. Thus even though one molar $Cu(NO_3)_2$ alone had little, if any, effect on the separation of ethylene over and above that one would get merely because of the greater solubility of ethylene in the solution as compared with ethane and methane, cupric ions seem as advantageous in enhancing the results when using silver nitrate as do increases in the concentration of the latter. Since cupric nitrate is less expensive than silver nitrate, the use of their combination may be desirable providing the copper does not cause any undesirable reaction with the membrane or the feed gas.

EXAMPLES 9 – 25

The procedure of Example 1 was run a substantial number of times while using a cellulose acetate filter having pores of 0.65 microns in diameter and either 1 molar silver nitrate or a solution that was 1 molar in silver nitrate and 3 molar in another nitrate as indicated in Table III below. The feed inlet pressure was 20 psig and the feed rate was 30 ml./min.

TABLE III

| Solution | Permeation Rate (ml./cm² min.) | Permeate Composition, Weight % He-free | | | S.F. |
|---|---|---|---|---|---|
| | | % $CH_4$ | % $C_2H_4$ | % $C_2H_4$ | |
| (Feed Composition | | 22.1 | 41.0 | 36.9) | — |
| 1M $AgNO_3$ | 0.064 | 1.3 | 96.7 | 2.0 | 42.2 |
| 1M + $Cr^3(NO_3)_3$ | 0.011 | 0.42 | 99.36 | 0.23 | 220 |
| 1M + $Ni(NO_3)_2$ | 0.023 | 0.22 | 99.70 | 0.08 | 478 |
| 1M + $Zn(NO_3)_2$ | 0.035 | 0.14 | 99.79 | 0.07 | 684 |
| 1M + $Cd(NO_3)_2$ | 0.023 | 0.24 | 99.64 | 0.12 | 398 |
| 1M + $Al(NO_3)_3$ | 0.015 | 0.19 | 99.78 | 0.03 | 653 |
| 1M + $LiNO_3$ | 0.043 | 0.55 | 98.86 | 0.60 | 123 |
| 1M + $Sr(NO_3)_2$ | 0.019 | 0.22 | 99.71 | 0.07 | 495 |
| 1M + $Ca(NO_3)_2$ | 0.26 | 0.22 | 99.66 | 0.12 | 422 |
| 1M + $Mg(NO_3)_2$ | 0.30 | 0.36 | 99.37 | 0.26 | 227 |
| 1M + $Co(NO_3)_2$ | 0.24 | 0.29 | 99.50 | 9.21 | 286 |
| 1M + $Fe(NO_3)_3$ | 0.020 | 0.37 | 99.25 | 0.37 | 190 |
| 1M + $NaNO_3$ | 0.012 | 0.40 | 98.95 | 0.65 | 135 |
| 1M + $Pb(NO_3)_2$ | 0.013 | 0.40 | 99.00 | 0.60 | 142 |
| 1M + $NH_4NO_3$ | 0.016 | 0.68 | 98.30 | 1.02 | 83 |
| 1M + $KNO_3$ | 0.21 | 1.01 | 97.70 | 1.29 | 61 |
| 1M + $UO_2(NO_3)_2$ | 0.023 | 0.38 | 99.10 | 0.52 | 158 |

Each of the solutions tested showed good selectivity for separating ethylene, and the selectivity of 1 molar silver nitrate was enhanced in each instance by the presence of the other non-noble metal or ammonium ions. The ions of the metals from Groups II to VIII of the fourth and fifth periods of the periodic chart and magnesium and $Al^{+3}$ ions seemed to be most effective. We particularly prefer to use the zinc and cupric ions in conjunction with the silver ions.

EXAMPLE 26

The cell of Example 1 was used to separate ethylene from a mixed hydrocarbon gas stream while employing cuprous ion as the complexing metal. Instead of the sandwich membrane of Example 1 the membrane was a single film of the XD-1 silicone polycarbonate polymer having a thickness of 0.3 mil. On top of this film was added 2 ml. of the aqueous complexing solution as indicated in Table IV below. The feed gas was a mixture of methane, ethane, ethylene, and propylene, and the gas was fed to the cell at 10 psig and was bubbled through the complexing solution at the rate of 25 ml./min. The reverse or exit side of the membrane was swept with nitrogen at the rate of 10 ml./min. The metal complexing solutions were 3 molar in each of CuCl and $NH_4Cl$ and in one case also 1 molar in HCl. The results of these tests were as follows:

TABLE IV

| Solution | Permeation rate (ml.² cm.² min.) | Composition of permeate weight percent, nitrogen-free | | | | S.F. |
|---|---|---|---|---|---|---|
| | | $CH_4$ | $C_2H_4$ | $C_2H_6$ | $C_3H_6$ | |
| Feed composition | | 14.02 | 32.47 | 21.04 | 32.47 | |
| CuCl—$NH_4Cl$ | 0.0578 | 0.88 | 67.00 | 1.27 | 30.85 | 25.0 |
| CuCl—$NH_4Cl$—HCl | 0.0979 | 0.52 | 73.37 | 1.19 | 24.92 | 31.6 |

Although the CuCl — $NH_4Cl$ solution gave a useful complex, the permeation rate and selectivity towards ethylene markedly increased by the presence of HCl. The ammonium chloride served to form the copper ammonium ion complex with ethylene, and the presence of hydrochloric acid provided additional acidity and increased $Cu^+$ solubility in the solution.

EXAMPLE 27

A cell similar to that of Example 1, but having a cross-sectional area of 2.75 cm² was used to concentrate acetylene and ethylene in a mixed hydrocarbon gas stream. The semi-permeable membrane was a silicone rubber film (RTV-60, trademark, General Electric) 6 mil in thickness and was supported on a porous disc. The film was covered with 2 ml. of an aqueous solution which was 3M in CuCl, 3M in $NH_4Cl$ and 3M in HCl. The feed gas was bubbled into the liquid solution in the cell at the rate of 10 ml./min. at 30 psig., and helium was used as the sweep gas at the rate of 10 ml./min. The results of these tests were as follows:

TABLE V

| Time from start-up, hrs. | Permeate composition, weight percent, He-free | | | | | S.F.₁[1] | S.F.₂[2] |
|---|---|---|---|---|---|---|---|
| | $CH_4$ | $C_2H_4$ | $C_2H_6$ | $C_2H_2$ | $C_3H_6$ | | |
| Feed composition | 12.9 | 41.4 | 21.3 | 7.5 | 16.8 | | |
| 1 | 0.33 | 57.6 | 0.67 | 30.2 | 11.2 | 48.3 | 3.4 |
| 2 | 0.33 | 58.5 | 0.67 | 30.8 | 9.7 | 51.7 | 3.5 |
| 3 | 0.30 | 58.3 | 0.60 | 30.3 | 10.5 | 44.9 | 3.4 |
| 4 | 0.30 | 58.0 | 0.60 | 30.8 | 10.3 | 56.2 | 3.5 |

[1] S.F.₁=selectivity for unsaturates.
[2] S.F.₂=selectivity for acetylene over olefins.

These data show that the system of this invention can be used to purify acetylene or to selectively remove acetylene from a gas stream containing olefins.

EXAMPLE 28

To illustrate that the separation techniques of this invention can be employed in systems having tubular membrane surfaces, a length of woven glass tubing (0.2 cm. in outside diameter and 4 inches long) was used to support the XD-1 silicone polycarbonate polymer and thereby form a semi-permeable membrane. The glass tubing is normally used as electrical insulation, and to form the membrane it was dipped several times into a 5 percent solution of the polymer. Each end of the coated glass tubing was connected to separate stainless steel tubings, and this unit was immersed in an aqueous 1 molar solution of silver nitrate in a test tube having a closed top. The coated glass tubing was totally immersed in the solution to provide a membrane area of 6.4 cm², and the stainless steel tubes projected through the closed end of the test tube. Sweep gas was passed into one of the stainless steel tubes, through the coated glass tube or membrane section, and then exited the other stainless tube with the material which passed through the membrane. Feed gas was bubbled into the solution in the test tube through an inlet tube passing through the test tube, and a gas outlet for withdrawing unreacted and undissolved components of the feed gas from the test tube was in communication through the top of the test tube to a position above the liquid complexing solution. Feed gas was passed into the feed inlet tube at the rate of 50 ml./min. and at 10 psig. Helium was employed as the sweep gas, and was passed through the woven glass tube at the rate of 10 ml./min. The exiting sweep gas containing the permeate was analyzed by gas chromatography. Several runs were made with the cell at various temperatures and Table VI has the results of this work:

TABLE VI

| Temperature of Cell, °F. | Permeate Composition, Weight %, He-free | | | Permeation Rate, ml./cm.²min. | S.F. |
| --- | --- | --- | --- | --- | --- |
| | $CH_4$ | $C_2H_4$ | $C_2H_6$ | | |
| (Feed Comp. | 22.1 | 41.0 | 36.9) | — | — |
| 76 | 7.9 | 74.5 | 17.6 | 0.017 | 4.2 |
| 90 | 4.8 | 86.2 | 9.3 | 0.023 | 9.0 |
| 110 | 3.6 | 89.8 | 6.8 | 0.030 | 12.7 |

EXAMPLE 29

The cell of Example 1 was used to separate ethylene and propylene from a mixed hydrocarbon gas stream which contained hydrogen. A sandwich membrane composed of top and bottom layers of 0.3 mil XD-1 silicone polycarbonate polymer films, and a middle layer of a cellulose filter paper saturated with a 6M $AgNO_3$ solution, was employed. To the cell was supplied the humidified feed gas containing methane, ethane, ethylene, propane, propylene and hydrogen at 20 or 40 psig and a rate of 10 ml/min. The permeate from the cell was purged from the bottom membrane surface as described in Example I except argon was used as the purge gas. The results are summarized in Table VII.

TABLE VII

| Inlet gas pressure, p.s.i.g. | Composition of permeate (mole percent Ar-free) | | | | | | S.F.[1] |
| --- | --- | --- | --- | --- | --- | --- | --- |
| | $H_2$ | $CH_4$ | $C_2H_4$ | $C_2H_6$ | $C_3H_6$ | $C_3H_8$ | |
| Feed composition | | | | | | | |
| | 5.9 | 32.8 | 47.4 | 3.5 | 7.8 | 2.4 | |
| 20 | 0.016 | 0.12 | 84.52 | (²) | 15.35 | (²) | 623.4 |
| 40 | 0.018 | 0.12 | 82.45 | (²) | 17.42 | (²) | 623.4 |

[1] Selectivity factor for unsaturates.
[2] These materials were not detected in the permeate and were assumed to be negligible or zero for the purpose of normalization.

NOTE.—These data show that the invention can be used with feed gases containing some non-hydrocarbon gases, such as hydrogen, without impairing membrane performance.

It is claimed:

1. A method for separation of aliphatically-unsaturated hydrocarbon of two to about eight carbon atoms which comprises contacting from a first side of a semi-permeable membrane a mixture containing said unsaturated hydrocarbon, with an aqueous liquid barrier in contact with said semi-permeable membrane which is essentially solid, water-insoluble and impermeable to said aqueous liquid, said liquid barrier having therein metal ions which combine with said unsaturated hydrocarbon to form a water-soluble complex, the partial pressure of said unsaturated hydrocarbon on a second side of said semi-permeable membrane being sufficiently less than the partial pressure of said unsaturated hydrocarbon on said first side of said semi-permeable membrane to release said unsaturated hydrocarbon on said second side of said semi-permeable membrane, and removing said released unsaturated hydrocarbon from the vicinity of said second side of said semi-permeable membrane.

2. The method of claim 1 wherein said mixture contains one or more of methane, ethane, propane and hydrogen.

3. A method for separation of aliphatically-unsaturated hydrocarbon of two to four carbon atoms which comprises contacting from a first side of a semi-permeable membrane, a vaporous mixture containing said unsaturated hydrocarbon and other vaporous hydrocarbon of two to four carbon atoms, with an aqueous liquid barrier in contact with said semi-permeable membrane which is essentially solid, water-insoluble, permeable to said vaporous mixture in the absence of said aqueous liquid and impermeable to said aqueous liquid, said liquid barrier having therein metal ions which combine with said unsaturated hydrocarbon to form a water-soluble complex, the partial pressure of said unsaturated hydrocarbon on a second side of said semi-permeable membrane being sufficiently less than the partial pressure of said unsaturated hydrocarbon on said first side of said semi-permeable membrane to release said unsaturated hydrocarbon on said second side of said semi-permeable membrane, and removing said released unsaturated hydrocarbon from the vicinity of said second side of said semi-permeable membrane.

4. The method of claim 3 in which the metal ions are cuprous ammonium ions.

5. The method of claim 4 in which the unsaturated hydrocarbon separated is acetylene.

6. The method of claim 3 in which said unsaturated hydrocarbon separated is ethylene.

7. The method of claim 6 in which the ethylene is in admixture with one or more of methane, ethane and hydrogen.

8. A method for separation of actylene which comprises contacting from a first side of a semi-permeable membrane, a vaporous mixture containing acetylene and other gaseous hydrocarbon, with an aqueous liquid barrier in contact with said semi-permeable membrane which is essentially solid, water-insoluble, permeable to said vaporous mixture in the absence of said aqueous liquid and impermeable to said aqueous liquid, said liquid barrier having therein metal ions which combine with acetylene to form a water-soluble complex, the partial pressure of acetylene on a second side of said semi-permeable membrane being sufficiently less than the partial pressure of actylene on said first side of said semi-permeable membrane to release acetylene on said second side of said semi-permeable membrane, and removing released acetylene from the vicinity of said second side of said semi-permeable membrane.

9. The method of claim 1 in which said metal ions are noble metal ions.

10. The method of claim 9 in which said noble metal ions are silver.

11. The method of claim 10 in which there are also present in said aqueous liquid non-noble metal or ammonium ions.

12. The method of claim 11 in which non-noble ions are present and are zinc or copper ions.

13. The method of claim 10 in which the unsaturated hydrocarbon separated is ethylene.

14. The method of claim 13 in which the ethylene is in admixture with one or more of methane, ethane and hydrogen.

15. The method of claim 3 in which said aqueous liquid is positioned adjacent said first side of said semi-permeable membrane and said vaporous mixture is passed into said liquid.

16. The method of claim 15 in which said unsaturated hydrocarbon separated is ethylene.

17. The method of claim 16 in which the ethylene is in admixture with one or more of methane, ethane and hydrogen.

18. The method of claim 17 in which the noble metal ions are silver.

19. The method of claim 18 in which said aqueous liquid also contains non-noble metal or ammonium ions.

20. The method of claim 19 in which non-noble metal ions are present and are zinc or copper ions.

* * * * *

UNITED STATES PATENT OFFICE
CERTIFICATE OF CORRECTION

Patent No. 3,758,603                 Dated September 11, 1973

Inventor(s) Edward F. Steigelmann and Robert D. Hughes

It is certified that error appears in the above-identified patent and that said Letters Patent are hereby corrected as shown below:

Column 5, line 55, change "its" to --their--;

Column 9, Table II, last line, "3M $Cu^3(NO_3)_2$" should be --3M $Cu(NO_3)_2$--;

Column 9, Table III, second line, "1M + $Cr^3(NO_3)_3$" should be --1M + $Cr(NO_3)_3$--;

Column 9, Table III, lines 52, 53, 54 and 57, second column from left, "0.26", "0.30", "0.24" and "0.21" should be --0.026--, --0.030--, --0.024-- and --0.021--, respectively;

In Tables IV, V and VII, "Feed composition" should be moved over to the left margin and moved downwardly to be opposite the first horizontal row of figures;

Claims 7, 14 and 17, first line of each, delete "the" and insert --said vaporous mixture contains--, and delete "is";

Claim 18, first line, delete "noble".

Signed and sealed this 2nd day of July 1974.

(SEAL)
Attest:

EDWARD M. FLETCHER              C. MARSHALL DANN
Attesting Officer                 Commissioner of Patents